July 22, 1958   W. L. HULSLANDER   2,844,162
LUBRICATED PLUG VALVE

Filed Jan. 6, 1956   2 Sheets-Sheet 1

INVENTOR.
WILLIAM LEO HULSLANDER
BY
HIS ATTORNEY

July 22, 1958 W. L. HULSLANDER 2,844,162
LUBRICATED PLUG VALVE

Filed Jan. 6, 1956 2 Sheets-Sheet 2

INVENTOR.
WILLIAM LEO HULSLANDER
BY
William D. Carothers
HIS ATTORNEY

United States Patent Office 2,844,162
Patented July 22, 1958

1

2,844,162

LUBRICATED PLUG VALVE

William Leo Hulslander, Osborne, Pa., assignor to Homestead Valve Manufacturing Company, Coraopolis, Pa., a corporation of Pennsylvania Application January 6, 1956, Serial No. 557,740

9 Claims. (Cl. 137—246.16)

This invention relates generally to a lubricated plug valve but more particularly to confined lubricating pressure chambers in large plug valves having metered passages thereto. This application is an improvement over my copending application Serial No. 464,736 filed October 26, 1954.

The plug valve comprising this invention may be either tapered or cylindrical and if cylindrical the plug should have sufficient clearance in the valve chamber to permit the whole of the exterior of the plug to be covered with a lubricant filling this clearance before the lubricating material continues to flow in the lubricating system and fill the lubricant chamber in the head with sufficient lubricant under pressure that it will move the plug against spring pressure and permit the escape of lubricant from around the stem. One of the important features of this invention is the provision of a dam in the head of the valve between the valve and the valve body that surrounds the stem and forms the lubricant pressure chamber. This dam is produced by an annular ring made of polyfluoroethylene compressed with a leached glass fiber. This ring functions as a seal defining the outer diameter of the lubricant pressure chamber, the inner diameter of which is closed by the seal ring made of the same material and which forms a part of my aforementioned copending application. This ring has a small and large bearing surface on opposite sides thereof and depending upon which side is up the plug valve may be provided with a fixed lubricant pressure or an automatic lubrication system. When the large area of the seal ring is up the lubricant chamber becomes automatic in retaining lubricant under pressure which is forced back through the system to replace any lubricant washed therefrom. When this seal ring is placed with the small area up the lubricant chamber becomes merely a lubricating passage chamber and does not function as a storage chamber.

Another improvement in this invention is the use of metered openings that connect the lubricant supply system to this lubricant chamber. These metered openings are in the form of drilled passageways which provide a greater accuracy in metering the flow of the lubricant than does a slot in the face of a plug as disclosed in the aforementioned prior application.

Another improvement in the structure of this valve resides in the location of the lubricant metering ports relative to the valve port. These lubricant ports are placed in phase or aligned with the large valve port being controlled. Thus when the valve is placed in its open position to permit the transmission of fluid therethrough the question of pressure on the plug is only that of the blind pressure of the fluid passing therethrough at which time the metered openings are aligned with the openings in the valve body. Greater pressures must be actuated when the valve is in its closed position in which case the metered ports are 90° from the point of highest pressure or the port in the valve body. This structural arrangement of parts together with the metering provides an improvement in the plug valve art.

The annular dam reduces the area of the lubricant pressure chamber on top of the plug valve. If this valve is very large and this lubricant chamber covers the whole top the pressure per square inch is so great that it holds the plug down and increases the friction against turning to an impractical degree. The dam reduces this lubricating reservoir area and thus the size of this area may be chosen to properly balance the pressure on the plug when open or closed. The selected area for a given lubricant pressure will provide the proper lubricant seal under satisfactory lubricant head or reservoir pressure.

Other objects and advantages of this improved lubricated plug valve appear hereinafter in the following description and claims.

The accompanying drawings show for the purpose of exemplification without limiting the invention or claims thereto certain practical embodiments illustrating the principles of the invention wherein:

Figure 1:
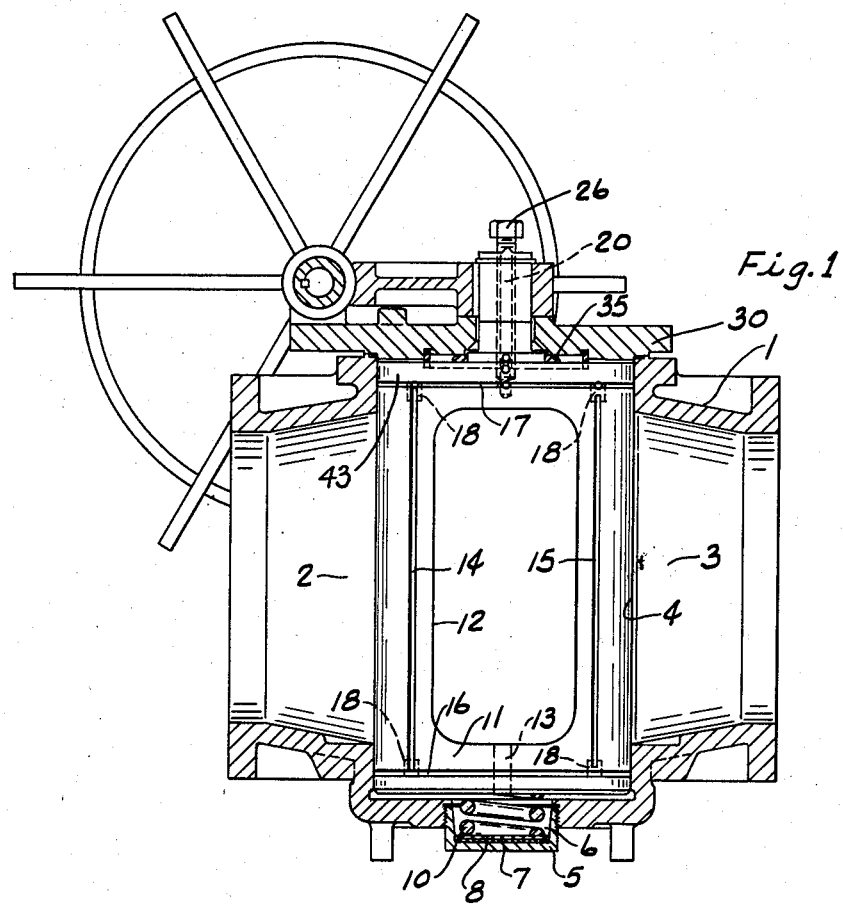
Fig. 1 is a view in vertical section of the valve comprising this invention shown in its closed position.
Figure 2:
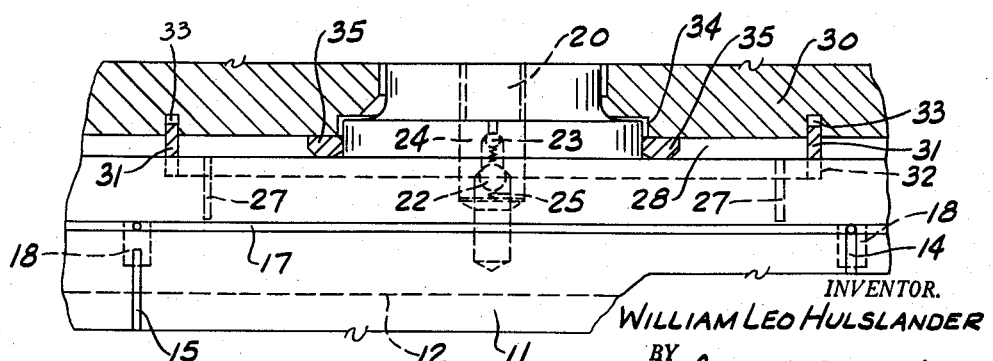
Fig. 2 is an enlarged view in vertical section showing the valve in Fig. 1 in its open position.
Figure 3:
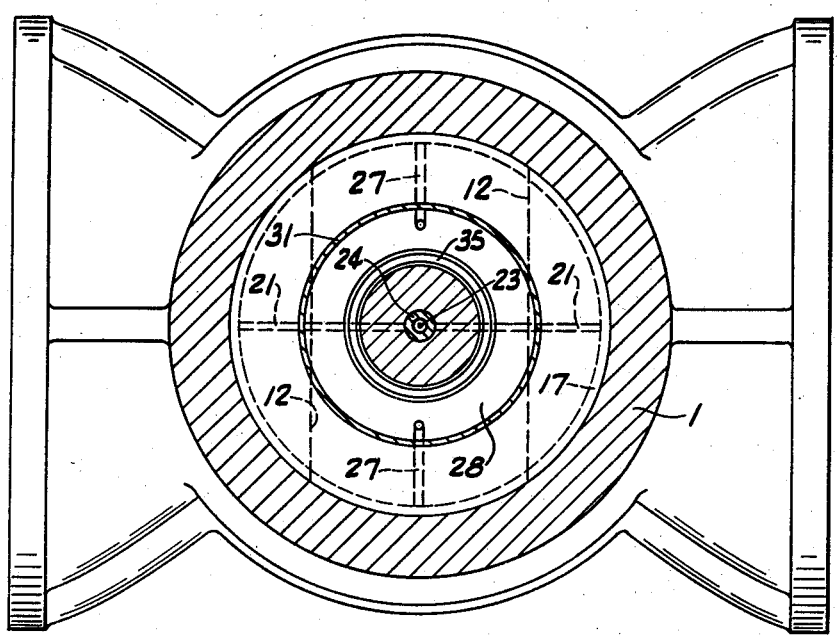
Fig. 3 is a view in horizontal section showing the valve in its closed position.

Referring to Figs. 1, 2 and 3 of the drawings the plug valve housing of the body 1 has the valve ports 2 and 3 opening into the valve chamber 4. The bottom of the valve chamber is closed by the screw plug 5 which has a pocket 6 to receive the bearing disc or washer 7 made of polyfluoroethylene. A steel washer 8 rides on top of the low friction polyfluoroethylene washer and supports the lower end of the spring 10, the upper end of which engages the bottom plug 11.

The plug 11 as shown is a single piece cylindrical plug member having a port 12 which connects the ports 2 and 3 of the body 1. The port 12 is usually connected to the space 6 by means of passage way 13 although this passage may be omitted. Line pressure is thus placed at the bottom of the plug valve when the port valve of the plug connects ports 2 and 3 of the valve body. When the plug has been closed on line pressure this pressure is retained in the valve body and is effective on the underside of the valve to force the latter upwardly against the head of the valve body.

The plug 11 is provided with four vertical channels positioned closely adjacent to the port 12. These channels are indicated at 14 and 15 on diagonally opposite sides of the plug. The ends of the channel 14 pass directly into the annular grooves 16 and 17 around the top and bottom of the valve. The ends of the channel 15 are spaced from these grooves 16 and 17 but are connected therewith through the pockets 18 in the valve body. Owing to the fact that the channels 14 and 15 are equally spaced quadrangular pockets 18 are provided at each of four corners of the valve body in the valve chamber. The annular groove 17 is a restricted groove being gauged according to the dimensions of the plug and is connected to the central bore 20 by the diametrically opposite radial grooves 21 shown in Fig. 3. The bore 20 is centrally disposed within the stem and has fitted therein the tandem check valves 22 and 23 housed in a cage 24 and biased to their closed position by a spring 25. The outer end of the bore 20 is provided with a lubricant screw 26. The lubricant is placed in the bore 20 as a plug. This lubricant is a special homogeneous viscous synthetic lubricant especilly compounded for a hydrocarbon service. A similar synthetic lubricant is employed for acids, caustics, and alkline solutions. This lubricant permits the handling of liquids, gases and solids in the valves and seals them effectively against high pressure. The lubricant will withstand impingement by solids. These are carried into the clearance by the body bore and the plug surfaces.

Such entrained solids being slivers of steel or powdered cement will not permit the seal to break as the seal is formed with this plastic lubricant which may be placed under a pressure in the lubricating system higher than the pressures of the line. The function and flow characteristics of this plastic lubricant is somewhat different in the lubricating system than what was heretofore commonly employed and known as a natural grease or oil. When the cylinder of the lubricant is placed within the bore 20 and screw 26 is screwed in to compress the lubricant. The lubricant will slowly flow past the check valve and out through the radial passages 21 to the annular distributing groove 17 from whence it flows through all of the channels 14, 15 and the annular groove 16 and spreads over the whole of the surface of the valve that is not open to the ports 2 and 3. Cylindrical plug valves are given a clearance of from one to five thousandths depending upon the diameter of the valve to permit the lubricant to cover the surface of the plug and the valve chamber. In valves from one-half to two inch in sizes the clearance ranges from .001" to .002". In valves two and one-half inch to six inch the clearance may be as much as from .002" to .003" and in valves eight to fourteen inches a clearance of from .003" to .005" may be necessary.

After the lubricant has filled the whole of the system and around the face of the plug filling the clearances between the plug and the valve body a resistance to flow is set up forcing the lubricant to pass through the metered passages 27 which extend horizontally toward the center of the plug and then vertically into the head chamber 28 formed between the top of the plug and the head 30 of the valve body. This head may or may not be removable as shown in the drawings. It is removable and it is held in place by the bolts passing through flanges in the head and the body. The chamber 28 is restricted in size by the cylindrical dam 31 which is fitted in the grooves 32 and 33 in the top of the plug and the underside of the head. This annular dam is made of polyfluoroethylene compressed with leached fiber glass or a nitrated fiber glass. The polyfluoroethylene and the fiber glass are mixed together and then compressed into the cylinder which is fired to sinter the material at a temperature from 600° to 650° F. The cylinder is then machined to size and shape. This material will not cold flow under 8,000 p. s. i. The leached glass fibers crush to a fine powder of SiO when compressed. This material also has a low coefficient of friction and when seated on the plug valve it forms a bearing surface thus providing material of low friction in the washer 7 at one end and the cylindrical ring 31 at the other end of the plug.

Figures 4, 5:
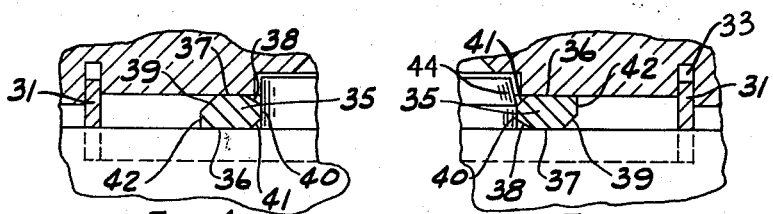
Fig. 4 is an enlarged sectional view showing the seal rings forming a lubricant pressure chamber comprising this invention.
Fig. 5 is an enlarged sectional view showing the seal rings arranged to provide automatic lubrication.
Figure 6:
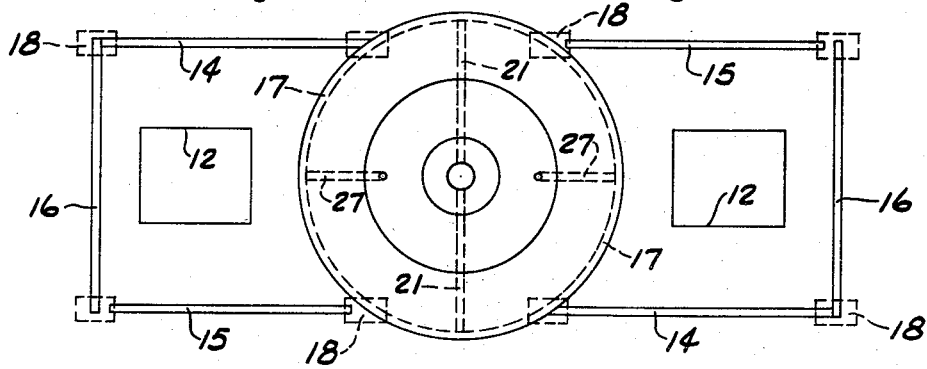
Fig. 6 is a digrammatic view showing the layout of the lubricant chambers.

It will be noted that the passageways 27 extend into the chamber 28 or in the inside of the dam 31. The inner or stem portion of the chamber 28 is provided with a cylindrical surface 34 on which the seal ring 35 is fitted. The seal ring 35 is shown in Figs. 4 and 5 with the cylindrical dam 31 and the seal ring is provided with two bearing surfaces the wide bearing surface 36 and the narrow bearing surface 37. The latter is bounded by the inner and outer sloping sides 38 and 39 which form that portion of the ring in a frusto conical cross section. The angles of inclination of these sloping sides are shown to be different. The inner sloping surface 38 is smaller than the outer sloping surface 39. The ring has a cylindrical bore 40 which fits on the cylindrical portion 34 of the stem on the plug. The bottom of the bore 40 is pivotal as indicated at 41 to allow the ring to slide on the cylinder 34 to its full limits without interference. The outer face of the ring is also cylindrical as shown in 42. This seal ring is also made of polyfluoroethylene compressed with a leached glass fiber or a nitrated fiber glass in exactly the same manner as that in the cylindrical dam 31.

The metering passages 27 are drilled holes in the plug and are sized so that they will not admit a lubricant under pressure in the chamber 28 until the whole of the valve's surface has been coated with the lubricant. The size of the two metering passages determine this function when taken with the character of lubricant and the clearances provided in the valve. When the lubricant finally passes to the valve head chamber 28 and fills the same the chamber itself functions as a seal to block the flow of fluid from around the valve plug between the stem and the valve body. The annular distributing groove 17 also functions as an annular seal in tandem with this seal in the chamber 28. Thus the lubricant in both of these positions provides spaced seals which are spaced by the land section between the groove 17 at the top of the plug as indicated at 43 and the chamber outside of the annular dam 31. Thus the stem of the plug is well sealed by a series of four annular sealing means.

As shown in Fig. 4 the seal ring 35 has its small or narrow bearing surface toward the valve head in contact therewith owing to the pressure at the bottom of the plug asserted by the spring 10 plus any line pressure acting on the bottom of the plug if the valve is open. As the lubricant fills the chamber 28 and asserts pressure therein. This pressure is effective on the top of the plug valve as well as on the large frusto conical surface 39 of the seal ring. When the lubricant pressure exceeds the line pressure and the spring pressure the washer 35 and the plug valve 11 move down to compress the spring 10 and permit lubricant to escape over the top of the washer 35 across the bearing surface 37. The annular grooves 32 and 33 permit this movement around the cylindrical dam without loss of pressure in the chamber 28. The lubricant escaping over the top of the seal 35 is then seen around the stem and it is known by this visual indication that the valve is properly lubricated and that all of the surfaces are covered with the lubricant.

To convert this valve into one having an automatic lubricating system a washer or seal ring 35 is inverted placing the narrow bearing surface 37 against the plug 11 and the broad bearing surface against the underside of the head as indicated in Fig. 5. With this seal ring inverted the lubricant pressure in chamber 28 keeps the seal against the head and allows the plug to move downwardly in its chamber. The upper end of the cylindrical surface 34 on the stem tapers to a smaller diameter to provide an escape as indicated at 44 in Fig. 5. When the smaller diameter is exposed underneath the seal ring 35. This of course permits the volume of the chamber 28 to be materially increased and filled with lubricant and the presusre retained in the chamber 28 is effective in maintaining the spring under compression. When the lubricant shows itself around the stem indicating that the chamber 28 is expanded to its greatest size and is properly filled no more lubricant need be added through the bore 20 until the lubrication is required to be replenished. Upon use of this valve some of the lubricant will be washed from the surface of the plug as it passes the pressure port of the valve body. This lubricant will be replaced in the grooves 15 and the corresponding faces of the plug after the plug has left its position and the pressure on the lubricant in the chamber 28 is relieved by a reverse flow to supply the needed lubricant in the system. The continuous pressure of the spring 10 supplies the needed pressure for aiding in the redistribution of the lubricant. As the plug again rises the seal ring 35 becomes more remote from the tapered surface 44 and until the chamber 28 reaches its smallest dimension at which time it should be replenished to automatically supply lubricant to the system. Thus lubricant is provided automatically to the system for the full distance of the cylindrical surface 34 on the stem.

Materials employed in valves of this character are different owing to the type of seal and the coverage of the sealing surface on the plug. The special lubricant permits valves to be constructed of aluminum alloys for use with gasoline, oil, benzol, and similar hydrocarbon products. Semisteel, cast iron and other forms of steel alloys can be used for the distribution of water in general or in steam soaps or in controlling steam soaps, mild acids and alkalines. For high temperature alkaline material a high carbon steel is employed. Brass and bronze are used for salt water and certain acids of this class and liquor. Monel material is employed for citrus juices and acids of this class for controlling food products in hot or cold conditions. In each instance the plug and the valve body are made of the same material and owing to the structure design lubricant and its distribution no galling can be detected between the plug and the body which demonstrates that the lubricant which covers the face also functions as the seal.

I claim:

1. A lubricated valve comprising a vented valve body having a head at one end and closed at the other end forming a valve chamber, a plug valve having rotary and limited axial movement in said chamber, a coaxially extending cylindrical surface on said valve plug, a pressure lubricated check ring having an inner annular surface surrounding and sealing on said coaxially extending cylindrical surface and having a top annular surface in sealing engagement with the underside of said head, cooperating annular surfaces on the top of said plug valve and on the underside of said head surrounding said first cylindrical surface and said ring, an annular dam in sealing engagement with said cooperating annular surfaces to produce a lubricant chamber sealed by said dam and said check ring, and a passage entering into said lubricant chamber.

2. The structure of claim 1 characterized in that said cooperating annular surfaces on the top of said plug valve and on the underside of said head are annular grooves and said dam fits in said grooves.

3. The structure of claim 2 characterized in that said cooperating grooves are aligned with each other.

4. The structure of claim 1 characterized in that said dam is a cylinder of compressed and sintered mixture of polyfluoroethylene and leached glass.

5. The structure of claim 1 characterized in that said passage is within said plug valve and is metered.

6. A lubricated valve comprising a vented valve body having a head at one end and closed at the other end forming a valve chamber, a lug valve having rotary and limited axial movement in said chamber, spring means on the underside of said plug urging it toward said head, cooperating annular surfaces on the underside of said head and on top of said plug valve, an annular dam in sealing engagement with said cooperating annular surfaces to encircle and partition off a portion of the space between the head and valve plug through said limited axial movement of said plug valve, and a passage entering into the encircled space portioned off by said dam.

7. The structure of claim 6 characterized in that said cooperating annular surfaces on the top of said plug valve and on the underside of said head are annular grooves and said dam fits in said grooves.

8. The structure of claim 7 characterized in that said cooperating grooves are aligned with each other.

9. The structure of claim 6 characterized in that said dam is a cylinder of compressed and sintered mixture of polyfluoroethylene and leached glass.

References Cited in the file of this patent

UNITED STATES PATENTS

| | | |
|---|---|---|
| 2,038,887 | Clade | Apr. 28, 1936 |
| 2,069,998 | Clade | Feb. 9, 1937 |
| 2,718,665 | Clade | Sept. 27, 1955 |

UNITED STATES PATENT OFFICE
CERTIFICATE OF CORRECTION

Patent No. 2,844,162                                      July 22, 1958

William Leo Hulslander

It is hereby certified that error appears in the printed specification of the above numbered patent requiring correction and that the said Letters Patent should read as corrected below.

Column 6, line 16, for "lug valve" read -- plug valve --.

Signed and sealed this 14th day of October 1958.

(SEAL)
Attest:

KARL H. AXLINE
Attesting Officer

ROBERT C. WATSON
Commissioner of Pate